April 28, 1925.

C. BETHEL ET AL

BEARING HOUSING

Filed Sept. 28, 1923

1,535,560

WITNESSES:
R. S. Harrison
S. M. Pineles

INVENTORS
Claude Bethel and
Edwin Tidlund
BY
Wesley G. Carr
ATTORNEY

Patented Apr. 28, 1925.

1,535,560

UNITED STATES PATENT OFFICE.

CLAUDE BETHEL, OF WILKINSBURG, AND EDWIN TIDLUND, OF PITTSBURGH, PENNSYLVANIA, ASSIGNORS TO WESTINGHOUSE ELECTRIC & MANUFACTURING COMPANY, A CORPORATION OF PENNSYLVANIA.

BEARING HOUSING.

Application filed September 28, 1923. Serial No. 665,353.

*To all whom it may concern:*

Be it known that we, CLAUDE BETHEL, a citizen of the United States, and a resident of Wilkinsburg, in the county of Allegheny and State of Pennsylvania, and EDWIN TIDLUND, a citizen of the United States, and a resident of Pittsburgh, in the county of Allegheny and State of Pennsylvania, have invented a new and useful Improvement in Bearing Housings, of which the following is a specification.

Our invention relates to self-oiling motor bearings and it has particular relation to bearings for motors that are employed for the propulsion of railway vehicles and for similar purposes.

Our invention has for its objects to provide a simple, practical and relatively inexpensive bearing housing having an oil reservoir formed therein, with capillary means for conducting the oil to the bearing, which will maintain a constant oil level and, consequently, a normal oil supply to the bearing, thereby eliminating oil waste.

A more specific object of our invention is to provide a bearing for a railway vehicle having an oil reservoir integral with the bearing, adapted to hold a large supply of oil and arranged to supply the oil to the bearing at a constant rate independently of the level of oil in the oil reservoir.

Figure 1:
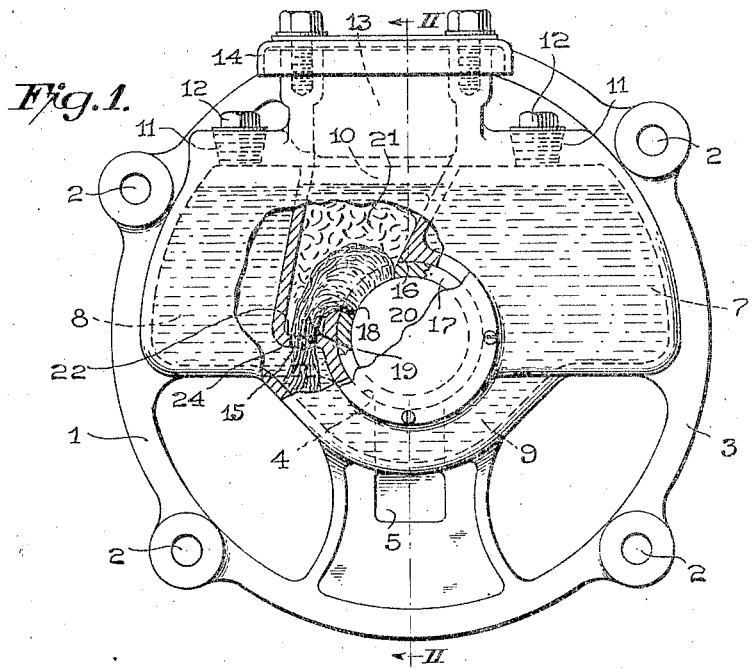
Figure 2:
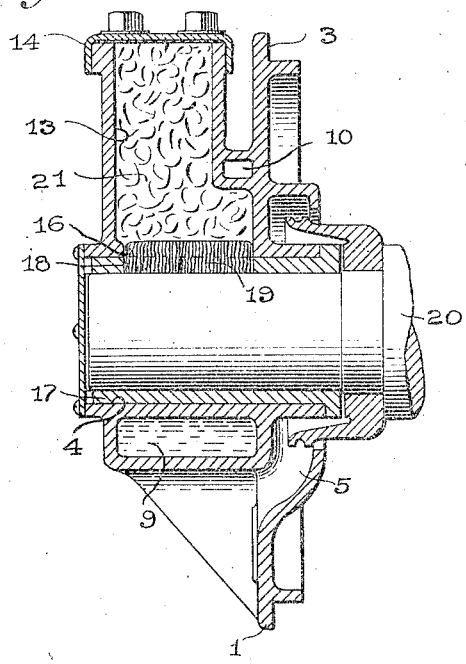

In the accompanying drawing,

Figure 1 is a view, in front elevation, of a bearing housing embodying our invention, a portion thereof being shown as broken away; and Fig. 2 is a view of the same in vertical section on line II—II of Fig. 1.

In the practice of our invention, we provide a housing or head 1 of suitable contour, having openings 2 spaced about a peripheral flanged portion 3, for the reception of suitable connecting bolts (not shown), whereby the housing may be connected to a motor frame or the like. The housing 1 is further provided with a centrally disposed journal bearing 4 and a drain opening 5. An oil reservoir 7 is provided at one side of the bearing, and a reservoir 8 at the opposite side, both reservoirs extending above the bearing and communicating with one another by a passage 9 beneath the bearing and by passage 10 above the bearing. The upper ends of the reservoirs 7 and 8 are provided with oil openings 11 which are normally sealed air-tight by plugs 12 or other suitable means.

Above the bearing 4, and between the oil reservoirs 7 and 8, is located a waste or lubricating chamber 13 having a preferably air or dust tight cover 14 at the top thereof. The chamber communicates with the reservoir 8 by an opening 15 of suitable predetermined size and located substantially at the height at which it is desired to maintain the oil level. The waste chamber 13 communicates with the bearing 4 by an opening 16 in the bearing shell.

A sleeve 17 is secured within the bearing and is provided with a lubricating opening or window 18 registering with the opening 16. Tightly fitting in the opening 15 at the bottom of the waste chamber 13 is a suitable capillary member or wick 19, which extends from within the oil supply reservoir 8 to the waste chamber 13 where it enters the bearing openings 16 and 18 of the bearing members and engages the shaft 20, the wick being covered by a quantity of loose waste 21 within the chamber 13. I may, however, dispense with a separate feeding wick and depend on the capillary action of the waste alone, the latter being tightly packed in the lubricating chamber.

In operation, a small amount of oil enters the waste chamber 13 through the opening 15 and the feeding wick 19 therein as indicated at 22. As the oil is used up in the waste chamber, the oil level therein will be lowered slightly, until air is permitted to pass by the lower edge of the opening 15 from the waste chamber to the oil reservoirs, thereby again permitting a small quantity of oil to enter the waste chamber. A much more constant oil level is thus automatically maintained in the waste chamber than has heretofore been possible, resulting in a saving of oil that would otherwise be wasted by over supply to the bearing during periods of excessive oil height in the waste chamber or its equivalent.

By making the fit of the feeding wick 19 in the opening 15 leading to the oil reservoir rather tight, we prevent an excessive rise of the oil level in the lubricating chamber and flooding of the bearing at the time when the plug 12 of the oil reservoir is temporarily removed and oil is being poured into the reservoir. In such case, the oil flow is restricted to the capillary channels in the feeding wick, and the very nature of these channels restricts the amount of oil which can pass through the opening, to a relatively small quantity, preventing the flooding of the bearing during the filling operation.

The amount of oil which is fed to the bearing depends upon the size of the feeding wick 19 and upon the height of the oil level at the feeding end of the oil reservoir, the latter being determined by the highest level of the opening 15, i. e. by the level 22 of the edge 24 of the opening around which the air bubbles must pass to permit more oil to pass from the reservoir to the lubricating chamber.

For proper lubrication, it is desirable to have the level of the oil somewhat below the lower edge of the lubricating window 16, and to keep the length of the fibrous feeding wick between the window and the oil level at about two inches, or not more than three inches, since, with an excessively short wick, small variations of the oil level have an undesirably large influence upon the rate of the oil supply. On the other hand, an excessive length of wick greatly reduces its oil-lifting capacity and is, therefore, undesirable. By our construction, the required proportion between the wick length, oil level and height of the lubricating window are obtained in a simple manner, the construction being also easily adaptable to any particular service requirements that may be encountered.

The improved bearing construction further permits the maintenance of an extraordinarily large supply of oil for lubricating the bearing, thus permitting long operation periods between successive refillings, and materially reducing the maintenance and upkeep cost of the motor. The full utilization of the large oil reservoir is obtained by the above-described oil feed arrangement which, while securing a uniform supply of oil to the bearing independently of the oil level in the reservoir, positively prevents an overflooding of the bearing.

While we have shown and described a certain embodiment of our invention, we desire that the disclosed embodiment shall be regarded as illustrative only and that the appended claims shall be accorded the broadest construction consistent with the prior art.

We claim as our invention:

1. A journal bearing comprising a collar surrounding the journal and having a lubricating opening communicating therewith, a hermetically closed oil reservoir disposed mainly above the lower edge of said lubricating opening and extending around said collar, a lubricating chamber communicating with said collar opening, means for providing a communicating passage between said oil reservoir and said lubricating chamber, the upper level of said communicating passage being below the lower edge of said collar opening, and fibrous oil-lifting means disposed in said lubricating chamber and extending into said communicating passage.

2. A journal bearing comprising a collar surrounding the journal and having a lubricating opening communicating therewith, a hermetically closed oil reservoir disposed mainly above the lower edge of said lubricating opening and extending around said collar integrally therewith, a lubricating chamber formed, at least in part, by walls of said oil reservoir and extending above said collar opening, one of said walls having an opening for supplying oil from said oil reservoir to said lubricating chamber, the highest level of said opening being below the lower edge of said collar opening, and fibrous material packed into said lubricating chamber.

3. A journal bearing comprising a collar surrounding the journal and having a lubricating opening communicating therewith, a hermetically closed oil reservoir disposed mainly above the lower edge of said lubricating opening and extending around said collar integrally therewith, a lubricating chamber extending above said collar opening, means for providing a communicating passage between said oil reservoir and said lubricating chamber, the upper level of said communicating passage being somewhat below the lower edge of said collar opening, and fibrous oil-lifting means disposed in said lubricating chamber and extending into said communicating passage.

4. A motor housing comprising a unitary journal bearing member comprising a collar surrounding the journal and having a lubricating opening communicating therewith, a flange extending from said collar for securing to said housing, a hermetically closed oil reservoir disposed mainly above the lower edge of said lubricating opening and extending around said collar, integrally therewith, a lubricating chamber extending above said collar opening, means for providing a communicating passage between said oil reservoir and said lubricating chamber, the upper level of said communicating passage being below the lower edge of said collar opening, and fibrous oil-lifting means disposed in said lubricating chamber and extending into said communicating passage.

5. A motor housing comprising a unitary journal bearing member comprising a collar surrounding the journal and having a lubricating opening communicating therewith, a flange extending from said collar to be secured to said housing, a hermetically closed oil reservoir disposed mainly above the lower edge of said lubricating opening and extending around said collar integrally therewith, a lubricating chamber formed, at least in part, by walls of said oil reservoir and extending above said collar opening, said lubricating chamber having an opening in the walls adjacent to said collar opening for communicating directly with said oil reservoir, the highest level of said opening being below the lower edge of said collar opening and fibrous material packed into said lubricating chamber.

6. A journal bearing comprising a collar surrounding the journal and having a lubricating opening communicating therewith, a hermetically closed oil reservoir disposed mainly, but not wholly, above the lower edge of said lubricating opening, a lubricating chamber communicating with said collar opening, means for providing a communicating passage between said oil reservoir and said lubricating chamber, the upper level of said communicating passage being below the lower edge of said collar opening, and a wick disposed in said lubricating chamber and fitting tightly in said communicating passage.

7. A journal bearing comprising a collar surrounding the journal and having a lubricating opening communicating therewith, a hermetically closed oil reservoir disposed mainly, but not wholly, above the lower edge of said lubricating opening, a lubricating chamber communicating with said collar opening, means for providing a communicating passage between said oil reservoir and said lubricating chamber, the upper level of said communicating passage being below the lower edge of said collar opening, a wick disposed in said lubricating chamber and fitting tightly in said communicating passage, and fibrous material packed into said lubricating chamber.

8. A journal bearing comprising a collar surrounding the journal and having a lubricating opening communicating therewith, a hermetically closed oil reservoir disposed mainly above the lower edge of said lubricating opening and comprising portions on both sides of said collar, a lubricating chamber communicating with said collar opening and disposed between the two portions of said reservoir, means for providing a relatively small communicating passage between said oil reservoir and said lubricating chamber, the upper level of said communicating passage being below the lower edge of said collar opening, and fibrous oil-lifting means disposed in said lubricating chamber and fitting tightly in said communicating passage.

9. A journal bearing comprising a collar surrounding the journal and having a lubricating opening communicating therewith, a hermetically closed oil reservoir disposed mainly above the lower edge of said lubricating opening, a lubricating chamber communicating with said collar opening, means for providing a communicating passage between said oil reservoir and said lubricating chamber, the upper level of said communicating passage being somewhat, but not more than three inches, below the lower edge of said collar opening, and fibrous oil-lifting means disposed in said lubricating chamber and fitting tightly in said communicating passage.

10. A journal bearing comprising a collar surrounding the journal and having a lubricating opening communicating therewith, a hermetically closed oil reservoir disposed mainly above the lower edge of said lubricating opening, a lubricating chamber communicating with said collar opening, means for providing a communicating passage between said oil reservoir and said lubricating chamber, the upper level of said communicating passage being approximately two inches below the lower edge of said collar opening, and fibrous oil-lifting means disposed in said lubricating chamber and fitting tightly in said communicating passage.

In testimony whereof, we have hereunto subscribed our names this 18th day of September, 1923.

CLAUDE BETHEL.
EDWIN TIDLUND.